United States Patent
Zankl et al.

(10) Patent No.: US 10,459,804 B2
(45) Date of Patent: Oct. 29, 2019

(54) DATABASE ROLLBACK USING WAL

(71) Applicant: Micro Systemation AB, Stockholm (SE)

(72) Inventors: Sebastian Zankl, Upplands Vasby (SE); Jani Niemenmaa, Arsta (SE)

(73) Assignee: MICRO SYSTEMATION AB (SE)

(*) Notice: Subject to any disclaimer, the term of this patent is extended or adjusted under 35 U.S.C. 154(b) by 457 days.

(21) Appl. No.: 15/139,424

(22) Filed: Apr. 27, 2016

(65) Prior Publication Data

US 2016/0321144 A1 Nov. 3, 2016

(30) Foreign Application Priority Data

Apr. 28, 2015 (EP) ..................... 15165484

(51) Int. Cl.
*G06F 16/27* (2019.01)
*G06F 11/14* (2006.01)
(Continued)

(52) U.S. Cl.
CPC ...... *G06F 11/1471* (2013.01); *G06F 11/1451* (2013.01); *G06F 16/219* (2019.01);
(Continued)

(58) Field of Classification Search
CPC ......... G06F 17/30312; G06F 17/30315; G06F 17/30327; G06F 17/30371;
(Continued)

(56) References Cited

U.S. PATENT DOCUMENTS 8,296,270 B2 * 10/2012 Kim .................... G06F 11/1471
707/672
8,364,648 B1 1/2013 Sim-Tang
(Continued)

FOREIGN PATENT DOCUMENTS

CN 101221573 A 7/2008
CN 104376091 * 2/2015 ....... G06F 17/30289
(Continued)

OTHER PUBLICATIONS

Murilo Tito Pereira, Forensic analysis of the Firefox 3 Internet history and recovery of deleted SQLite records, May, 2009, digital investigation, 5 (2009), pp. 93-103.*
(Continued)

*Primary Examiner* — Jay A Morrison
*Assistant Examiner* — Antonio J Caiado
(74) *Attorney, Agent, or Firm* — Condo Roccia Koptiw LLP

(57) ABSTRACT

In the field of forensic analysis of databases, a method of performing database rollback to a previous state of a database using a write-ahead log (WAL) includes: selecting, in the set of frames recorded to the WAL, a specific frame representing a specific revised content of a corresponding specific page; identifying, in the set of frames, a first subset of frames containing the specific frame and zero or more thereto chronologically preceding frames; extracting, from the set of pages of the database, a first subset of pages; extracting, from the corresponding pages of the first subset of frames, a second subset of pages; and performing, based on the contents of the first subset of pages and the revised contents of the second subset of pages, a rollback of the database to a previous state containing the revised content of the specific page.

13 Claims, 2 Drawing Sheets

(51) Int. Cl.
*G06F 16/23* (2019.01)
*G06F 16/21* (2019.01)
*G06F 16/90* (2019.01)

(52) U.S. Cl.
CPC ...... *G06F 16/2358* (2019.01); *G06F 16/2365* (2019.01); *G06F 16/273* (2019.01); *G06F 16/90* (2019.01); *G06F 2201/80* (2013.01); *G06F 2201/82* (2013.01)

(58) Field of Classification Search
CPC ......... G06F 17/30569; G06F 17/30088; G06F 17/3023; G06F 17/30781; G06F 17/30964; G06F 17/30309; G06F 17/30368; G06F 17/30578; G06F 17/30943; G06F 11/1435; G06F 11/1471; G06F 11/1451; G06F 2201/80; G06F 2201/82; G06F 16/273; G06F 16/219; G06F 16/2358; G06F 16/2365; G06F 16/90
See application file for complete search history.

(56) References Cited

U.S. PATENT DOCUMENTS

| | | | | |
|---|---|---|---|---|
| 8,527,462 | B1* | 9/2013 | Talius | G06F 16/1734 707/639 |
| 8,683,262 | B1* | 3/2014 | Subbiah | G06F 16/90 714/16 |
| 9,558,078 | B2* | 1/2017 | Farlee | G06F 11/1471 |
| 9,811,548 | B2* | 11/2017 | Stigsen | G06F 16/2365 |
| 2003/0079157 | A1* | 4/2003 | Lee | G06F 11/1474 714/20 |
| 2004/0220961 | A1 | 11/2004 | Lee et al. | |
| 2007/0005664 | A1* | 1/2007 | Kodavalla | G06F 11/1471 |
| 2008/0256138 | A1* | 10/2008 | Sim-Tang | G06F 11/1435 |
| 2010/0191922 | A1* | 7/2010 | Dickey | G06F 3/061 711/154 |
| 2010/0287196 | A1* | 11/2010 | Shields | G06F 17/30781 707/769 |
| 2012/0310895 | A1* | 12/2012 | Hoog | G06F 17/30569 707/675 |
| 2013/0332910 | A1* | 12/2013 | Ganai | G06F 11/3692 717/131 |
| 2014/0317062 | A1* | 10/2014 | Xue | G06F 11/1435 707/674 |
| 2015/0006591 | A1* | 1/2015 | Lee | G06F 16/2379 707/824 |
| 2015/0088844 | A1* | 3/2015 | Stigsen | G06F 16/2365 707/703 |
| 2015/0149500 | A1* | 5/2015 | Cowling | G06F 11/2094 707/769 |

FOREIGN PATENT DOCUMENTS

| | | | |
|---|---|---|---|
| CN | 104504062 A | 4/2015 | |
| KR | 101484882 | * 1/2015 | ......... G06F 11/1448 |

OTHER PUBLICATIONS

SQLite, Database File Format, Jul. 2004, SQLite.org, Releases of SQLite since version 3.0.0 (Jun. 18, 2004), pp. 1-30.*
Sangjun Jeon ; Jewan Bang ; Keunduck Byun ; Sangjin Lee, A recovery method of deleted record for SQLite database ,Jul. 24, 2011, Springer-Verlag London Limited 2011, DOI 10.1007/s00779-011-0428-7, pp. 707-715.*
Alex Caithness, The Forensic Implications of SQLite's Write Ahead Log, May 4, 2012, ccl-forensics.com, all pages. (Year: 2002).*
Jeon et al., A recovery method of deleted record for SQLite database, Pers Ubiquit Comput, 2012, all pages. (Year: 2012).*
SQLite, Database File Format, https://www.sqlite.org/fileformat.html, 2004, SQLite version 3.0.0, all pages. (Year: 2004).*
Li Quian et al: Database management strategy and recovery methods of Android, 2014, 2013 IEEE 4th International Conference on Software Engineering and Service Science, pp. 727-730. (Year: 2014).*
Murilo Tito Pereira, Forensic analysis of the Firefox 3 Internet history and recovery of deleted SQLite records, Brazilian Federal Police, Computer Forensics, Oct. 10, 2008, all pages. (Year: 2008).*
Li Qian et al: "Database management strategy and recovery methods of Android" 2013 IEEE 4th International Conference on Software Engineering and Service Science, IEEE, Jun. 27, 2014 pp. 727-730.
CN104504062 A, Cited in Office Action dated Oct. 16, 2018, in related.

* cited by examiner

DATABASE ROLLBACK USING WAL

RELATED APPLICATIONS

This application claims the benefit of European Patent Application No. 15165484.5, filed on Apr. 28, 2015, the contents of which are hereby incorporated by reference.

TECHNICAL FIELD

The invention disclosed herein relates to the field of forensic analysis of databases, and more particularly to methods and devices for performing a database rollback to a previous state of a database using a write-ahead log.

BACKGROUND

Normally, the need to perform database recovery arises after a database system has failed, such as after a power failure or a system crash. In order to preserve the integrity of the data stored in the database, the database system must bring the database back to the latest consistent state which existed prior to the failure. If, for example, a system crash occurs in the middle of a fund transfer between two accounts at a bank, the reasonable way of recovery would be to reset the database to the state it was in just before the fund transfer was initiated, and then redo the transfer again afterwards. Otherwise, the bank may not be able to guarantee that for example money was not withdrawn from one of the accounts even though the money never reached the other account before the crash.

In addition to the above, the need to perform database recovery may arise also for other reasons. One such reason is that of forensic analysis, where a need to recover data that may have been voluntarily deleted or modified is sometimes paramount. When a file containing data is deleted from, or modified on, e.g. a hard drive, the operating system usually only updates its file system metadata where e.g. the location of a particular file on the hard drive is stored. If a file is deleted, the metadata is updated, while the actual data of the file (as written to the hard drive) is left untouched. Thus, even though the file system metadata is updated, or missing, a forensic analyst can use methods such as data carving in an attempt to locate and read the original data of a deleted or modified file. Many of the methods of data carving, such as e.g. pattern searching, are often complex and rely on both complex models and heuristics. In addition to the problem that the number of different possible permutations of scattered (or fragmented) data is often large, the methods may also suffer from the fact that the outcome is not always guaranteed to be correct. A data carving method may end up piecing several fragments from several different files together into what it believes to be a single file, thus generating a false result (a false positive). If the number of false positives becomes too great, the job of the forensic analyst becomes difficult and the trustworthiness of the result may quickly degrade.

A more reliable method for recovering (un)intentionally deleted or modified data in a database may be to use the logging functionality often used by many database systems. To be able to bring a database back (i.e. to perform a database rollback) to a previous state, the database system may keep track of the actions that are performed on the database (i.e. the changes to the database) by using a so called write-ahead log (a WAL). When an action is impending on a database, a database system using a WAL will not update the database directly. Instead, the database system will determine the outcome of the action and record the changes that would have been made to the database to the log instead. In the event of a system failure during the time an action is performed, the database will already be in a consistent state, and the database system may easily check the WAL to see how far it got before the system failed, and then make a decision on how to proceed from there. In order for the WAL not to grow too large, the recorded changes in the WAL can be transferred back to the database either on regular occasions (such as after each action is successfully completed, or a lot more sparsely than so if wanted) or when triggered manually. Such an operation, known as a checkpoint operation, is usually followed by the WAL being reset such that new, to the checkpoint subsequent, changes are recorded from the start of the WAL again.

A method using a WAL to recover a database from a system failure is disclosed in U.S. Pat. No. 8,683,262. There, the WAL is first filtered such that irrelevant actions (e.g. actions that are later made ineffectual by other, subsequent, actions) are ignored in order to reduce computational complexity. Using the filtered WAL, the database is transitioned from a recovery state to a normal operation state by replaying the remaining actions in the filtered WAL. Since the main focus of the disclosed method is to restore a database after a failure, situations may arise where the method is of little or no use to a forensic analyst.

In light of the above, an improved, more flexible, more reliable and for forensic analysis more suitable method for performing database rollback to a previous state of a database using a WAL is thus required.

SUMMARY

An object of the present invention is therefore to at least partially fulfill the requirements specified above. This and other objects of the invention are at least partially met by the invention as defined in the independent claims, while preferred embodiments are set forth in the dependent claims. The present invention is based on the insight that a write-ahead log may contain information allowing a forensic analyst to extract information about a previous database state, where the time of the previous state may correspond to any of the checkpoint(s) in the WAL, and where the extracted previous state in some situations may be guaranteed to be a true previous state (thus eliminating the risk of getting false positives).

Within a first aspect of the present invention, a computer-implemented method for database rollback to a previous state of a database is provided. The database contains a first set of pages, and the database is associated with a write-ahead log (WAL) into which a set of frames representing revised contents of a second set of pages has been recorded. As used herein, a database "page" represents a unit of data that is used by a database system when storing the contents of a database. If the size of the data stored in a database exceeds that of a single page, the database data will be distributed over, and stored in, multiple pages where every page preferably has a fixed size. When a change to the database is made, such as when information is added, updated or removed, the database system may choose to store only the affected pages in the WAL, where the updated, or revised, content of a page will be encapsulated in a "frame". A frame may contain the updated content of the page itself along with other attributes that may be useful when reading the log, such as for example information about what page in the database that was updated, and when the update took place. In the WAL, each frame in the set of frames therefore represents a revised content of a corresponding page, and the WAL further contains information that allows the frames to be chronologically sorted, so that a reader of the WAL may figure out in which order the frames were recorded.

The database may further be associated with checkpoint information that indicates that revised content of at least one page was transferred from the WAL to the database at a set of at least one checkpoint, where each checkpoint corresponds to a point in time, and where each frame in the set of frames corresponds to one of said checkpoints. As used herein, a "checkpoint" can be initiated by the database system itself, for example as a response to the WAL growing larger than a predefined value, or e.g. as a response to an elapse of a certain time interval. A checkpoint can also be initiated by a user giving a certain command or by a computer program, or similar, that is accessing the database. Usually, a checkpoint involves updating the database by transferring, from the WAL to the database, the most recently (in time) revised contents of the pages found within the frames in the WAL, and thereafter performing a "reset" of the WAL such that the WAL can be overwritten by subsequent updates in order to save space. A checkpoint may also involve transferring only the revised contents of some of the pages, without performing such a subsequent reset of the WAL. An example of the latter may involve situations in which users of the database for example have a lock on one or more of the frames in the WAL. In such situations, only some frames may be transferred to the database right away, while other frames will be transferred, if necessary, at a later time. If the database was just created, or if no checkpoint operations have yet taken place, the creation of the database may count as a checkpoint. To make sure that only the most recent revisions of a page are transferred to the database during a checkpoint operation, each frame in the WAL usually corresponds to a certain checkpoint, and information about which checkpoint a certain frame corresponds to is usually included in the frame itself. Usually, only frames corresponding to the latest checkpoint will be considered for transfer during a new checkpoint operation.

In the first aspect, the method may comprise the step of selecting a specific frame in the set of frames recorded to the WAL. The specific frame represents a revised content of a corresponding specific page and corresponds to a checkpoint that chronologically precedes zero or more checkpoints in the set of at least one checkpoint indicated in the checkpoint information. If the specific frame precedes zero checkpoints, the specific frame was recorded to the WAL after the latest checkpoint operation, and the revised content of the specific page has not yet been transferred to the database. If the specific frame precedes one or more checkpoints, the frame was recorded to the WAL before the latest checkpoint, and the revised content of the specific page may already have been transferred to the database during a previous checkpoint operation.

The method may further comprise the step of identifying a first subset of frames in the set of frames, such that the first subset contains the specific frame and thereto zero or more chronologically preceding frames. If the method is to recover what the database (partially) looked like at a certain specific time (at which the specific frame was recorded), knowledge about what happened earlier than the specific time is needed. This is reflected in that only the specific frame and frames recorded to the WAL at an earlier time are included in the first subset of frames. If the specific frame is chronologically subsequent to the latest checkpoint, the first subset of frames is preferably identified such that it contains as many of the corresponding pages of the frames in the set of frames that are preceding the specific frame as possible. This is true also if the specific frame precedes the latest checkpoint, but preferably with the added condition that the first subset contains frames corresponding only to the same checkpoint. This will further be discussed in conjunction with FIG. 2.

The method may also comprise the step of extracting a first subset of pages from the first set of pages. This subset of pages may contain either all, some or none of the pages found in the first set of pages, depending on e.g. the specific time and how it relates to the latest checkpoint indicated in the checkpoint information. For example, if the revised content of the specific page is older than the content of a corresponding page in the first set of pages (found in the database), a rollback to a previous state containing the revised content of the specific page may not require that the particular corresponding page in the first set of pages is included in the extracted first subset of pages.

The method may comprise the step of extracting a second subset of pages from the corresponding pages of the first subset of frames, and the method may further comprise the step of performing a rollback of the database to a previous state containing the specific revised content of the specific page. The rollback is based on the content of the first subset of pages and the revised content of the second subset of pages.

By selecting the respective subsets of frames and pages appropriately, and by taking the times of when the respective frames (and page contents) were recorded to the log into account and by comparing these times to when the database was last updated (that is, when a checkpoint operation was last performed), a previous state of the database may be created during the rollback. This will also be further discussed in conjunction with FIG. 2.

As used herein, a set of frames may contain many revised contents of the same page. As an example, if a WAL contains 32 frames representing a revised content of a first page, those 32 frames are still said to represent the same first page.

In one example embodiment, the specific frame may correspond to a checkpoint that chronologically precedes one checkpoint in the set of at least one checkpoint. Such a frame was recorded to the WAL before the latest checkpoint, but after the checkpoint immediately preceding the latest checkpoint. If there are frames in the WAL that correspond to the same checkpoint as, and are chronologically subsequent to, the specific frame and represent revised contents of the same corresponding page as the specific page, the content of the specific page may be older than the content of the corresponding page currently found in the database. The possibility of extracting information preceding the latest checkpoint is advantageous in that an extended timeline of performed actions, including actions preceding the latest checkpoint, on the database may be envisioned.

In one example embodiment, the method may further comprise the step of identifying, in the set of frames, a second subset of frames containing zero or more to the specific frame chronologically subsequent frames, where the second subset of frames corresponds to a third subset of pages. The method may comprise the step of determining that the third subset of pages contains at least one page that is not part of the second subset of pages, and indicating that the previous state is not a true previous state. From a forensics point of view, such an embodiment is advantageous in that previous information may be extracted at least partially, and in that a forensic analyst may be made aware of that the extracted state may be only partly identical to a previous state of the database. In another example embodiment, the method may comprise the step of determining that the third subset of pages is a subset of the second subset of pages, and indicating that the previous state is a true previous state. A forensic analyst may benefit from being made aware about that the information extracted is identical to a previous state of the database.

In one example embodiment, the specific frame may correspond to a checkpoint that chronologically precedes more than one checkpoint in the set of at least one checkpoint. Such a frame was recorded to the WAL before both the latest checkpoint and the checkpoint immediately preceding the latest checkpoint. If such a specific frame is selected, information may be extracted about changes made to the database several checkpoints earlier, and a longer timeline of how the database has been modified may therefore be constructed and be beneficial from a forensics point of view.

In a further example embodiment, the method may further comprise the step of determining that the first set of pages contains at least one page that is not part of the second subset of pages, and indicating that the previous state is not a true previous state. Even if a true previous database state may not be created, retrieval of at least some data may be beneficial, and even more so if said data is marked as not being a true previous state. In another example embodiment, the method may comprise the step of determining that the first set of pages is a subset of the second subset of pages, and indicating that the previous state is a true previous state.

Herein, a "true previous state" means that the state (re)created is identical to what the state of the database were at a specific time when the specific frame were recorded to the WAL, and that information extracted from the database at the previous specific time would have been identical to information extracted using the method of the first aspect of the present invention. This includes that both the content of the specific page, and the contents of all other pages of the database, are equal to what they were at the specific time.

In one example embodiment, the database may be a SQLite database or a derivative thereof. SQLite is often used as a database for applications in e.g. mobile phones or tablet computers. Consequently, the present invention can be used for forensic analysis of such devices.

In one example embodiment, the checkpoint information may be found in the WAL, a shared-memory file or in a combination of both.

In one example embodiment, the information allowing the frames to be chronologically ordered may comprise the order in which the frames are written in the WAL, a salt-value, a counting index, or a combination thereof.

Within a second aspect of the present invention, a computer program product is provided. The computer program product comprises a computer-readable storage medium with instructions adapted to carry out the method according to the first aspect of the present invention, when executed by a device having processing capability.

Within a third aspect of the present invention, a device configured to perform database rollback to a previous state of a database is provided. The database comprises a first set of pages, and the database is associated with a WAL into which a set of frames representing revised contents of a second set of pages has been recorded, where each frame represents a revised content of a corresponding page. The database is further associated with checkpoint information that indicates that revised content of at least one page was transferred from the WAL to the database at a set of at least one checkpoint, where each checkpoint corresponds to a point in time, and where each frame in the set of frames corresponds to one of said at least one checkpoint. The WAL further comprises information that allows the frames to be chronologically ordered, and the device is adapted to access the database and the therewith associated WAL and checkpoint information. Such access may be provided over a network, a bus or any other suitable communication link. The device may comprise a memory and a processor, where the memory may be used to store, temporarily or permanently, at least part of the WAL and checkpoint information. The processor may be configured to select, upon request, a specific frame in the set of frames, where the specific frame represents a specific revised content of a corresponding specific page, and where the specific frame corresponds to a checkpoint that chronologically precedes zero or more checkpoints in the set of at least one checkpoint. The processor may also be configured to identify, in the set of frames, a first subset of frames that contains the specific frame and thereto zero or more chronologically preceding frames. The processor may be configured to extract a first subset of pages from the first set of pages, and the processor may also extract a second subset of pages from the corresponding pages of the first subset of frames. The processor may be configured to perform, based on the content of the first subset of pages and the revised content of the second subset of pages, a rollback of the database to a previous state that contains the specific revised content of the specific page.

The second and third aspect can be embodied correspondingly to the first aspect, and the advantages mentioned in the definition of the first aspect are equally applicable to the second and third aspect. It is noted that the invention relates to all combinations of features, even if recited in mutually different claims.

BRIEF DESCRIPTION OF THE DRAWINGS

The present invention will now be described more fully with reference to the accompanying drawings, on which.

Unless explicitly stated to the contrary, the drawings show only such elements that are necessary to illustrate the example embodiment, while other elements, in the interest of clarity, may be omitted or merely suggested.

DETAILED DESCRIPTION OF EXAMPLE EMBODIMENTS

Figures 1A, 1B:
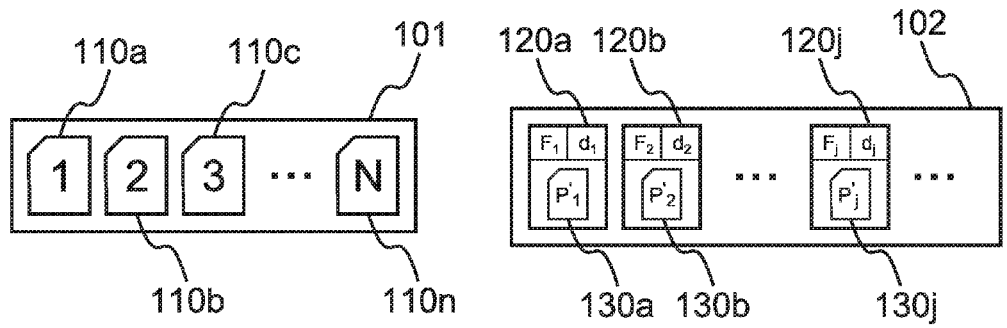
FIG. 1a is a diagrammatic view of a database comprising a set of pages.
FIG. 1b is a diagrammatic view of a write-ahead log (WAL) and checkpoint information associated with the database.

A diagrammatic view of a database 101 is shown in FIG. 1a. The information of the database is stored as a set $D=\{1, 2, 3, \ldots, N\}$ of pages 110a-110n, where $N \geq 1$ is an integer corresponding to the number of pages currently in the set. If, for example, more information is added to the database 101, the number of pages 110 required may increase. Likewise, if information is removed from the database 101, or if a "vacuum" command is issued, the number of pages 110 needed may decrease. In general, the number of pages 110 of the database 101 is a dynamic quantity, and it is up to e.g. the database system to keep track of what information is to be found on what page.

To reverse an action performed on the database 101, a database system using a write-ahead log (WAL) will not directly update the database when a new action is performed. Instead, the consequences of an action will be logged in the WAL, and a diagrammatic view of such a WAL 102 is shown in FIG. 1b. When an action is performed on the database 101, the database system will decide which of the pages 110 of the database 101 that are affected by the action. If a page is affected, the database system will store the revised content of that page in a frame and record that frame to the WAL. The WAL 102 shown in FIG. 1b comprises a set $S=\{F_1, \ldots\}$ of such recorded frames 120 representing revised contents of a set $D'=\{P'_1, \ldots\}$ of pages 130, wherein each frame $F_j$ (where $j \geq 1$) 120$j$ represents a revised content of a corresponding page $P'_j$ (where $P'_j \in [1,L]$ and $L \geq N$) 130$j$.

If a query for information found on a certain page of the database 101 is made, the database system may, instead of reading the contents of the certain page as found in the current database 101, check the WAL 102 to see if a more recent (revised) version of the certain page is found there. If that is the case, the database system may use this revised version of the certain page instead. If the WAL 102 does not contain a more recent version of the certain page, the page found in the database 101 itself is used instead. By so doing, the result of the query will be representative of the most recent state of the database, even though the actual database itself has not been updated. If the action that caused the most recent update of the database 101 is to be reversed, the database system may ignore the most recent (revised) version of the page found in the WAL 102, and instead use either another version of the same page found in the WAL 102 or the page in the database 101 itself.

If more and more actions are performed on the database, the size of the WAL 102 will grow as more and more frames (representing revised contents of corresponding pages) are recorded to it. To keep the WAL 102 from growing too large, an operation referred to as a "checkpoint" operation may be performed. During a checkpoint operation, the revised contents of pages found in the WAL 102 may be transferred to the database and the causing actions may be made permanent. If, during a checkpoint operation, a more recent (revised) version of a page is found in the WAL 102, the revised content of that page will replace the content of the same page currently found in the database. When the checkpoint operation is completed, the WAL 102 may be "reset" such that new frames may be added to the beginning of the WAL 102, overwriting the frames recorded before the checkpoint operation took place if necessary. In database terminology, the recorded frames in the WAL 102 correspond to actions performed during a transaction, and a frame in the WAL 102 may be marked as corresponding to a "commit" operation wherein actions belonging to the same transaction are commited. The WAL 102 may, and often do, contain frames corresponding to multiple transactions.

In order for the database system to know which frames that were recorded after e.g. the latest checkpoint operation, the database may be associated with checkpoint information that indicates that revised content of at least one page was transferred from the WAL 102 to the database 101 at a set $C=\{c_1, \ldots\}$ of checkpoints, where each checkpoint $c_k$ ($k \geq 1$) corresponds to a point in time. By associating each frame with a corresponding checkpoint in the set C (i.e., each frame $F_j$ is associated with a checkpoint $d_j$, where $d_j \in C$), it may then be possible for e.g. the database system to figure out after which checkpoint, or between what pair of checkpoints, a certain frame was recorded, and how recent the revised content of the corresponding page is compared to e.g. the content of the same page currently in the database 101. Each checkpoint may be given a corresponding unique ID, and the unique ID may be indicated in the frames recorded to the WAL 102 during the time interval between the checkpoint operation and the next one. When a new checkpoint operation is performed, the unique ID is changed, and each frame may therefore be connected to a certain time interval. Frames connected to the same interval may be individually chronologically ordered by taking into account the order in which they were recorded to the WAL. Another way of keeping track of the chronological order may include giving every checkpoint a time stamp corresponding to the time when the checkpoint operation was performed, and by giving every frame a time stamp corresponding to the time when the frame was recorded to the WAL 102. By comparing the time stamps, a chronological order may be established.

The inventors have realized that even though the WAL 102 may have been reset, frames that were recorded after earlier checkpoint operations than the latest one may still be left in the WAL 102, and that information about previous states of the database may thus be extracted.

Figure 2:
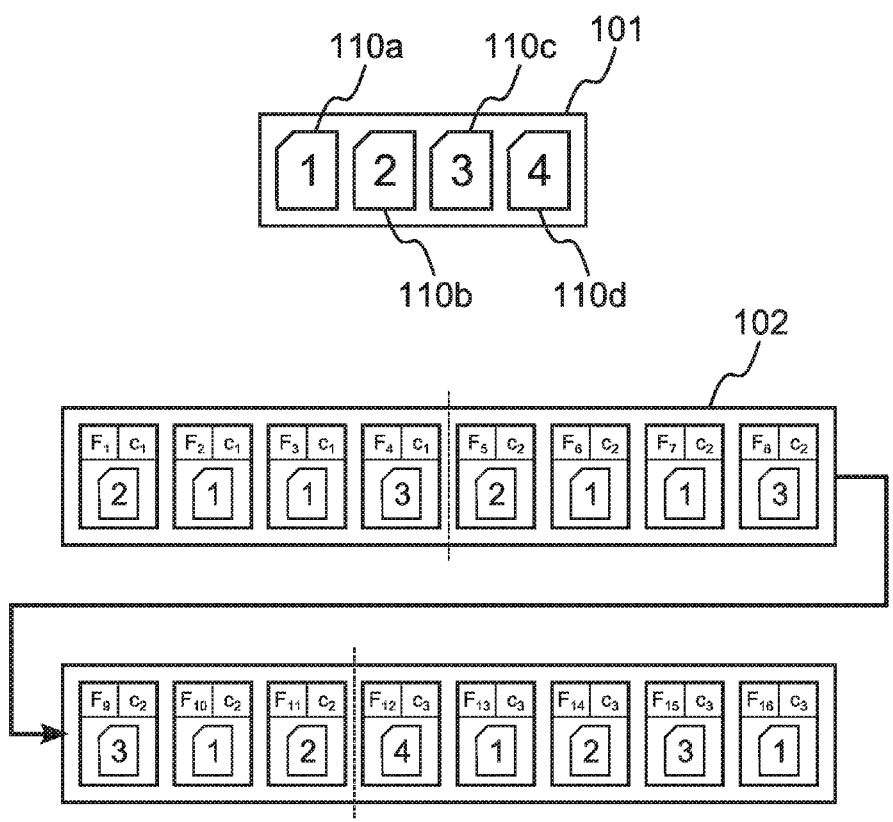
FIG. 2 is a diagrammatic view of an exemplary database, WAL and checkpoint information.

To illustrate how a computer-implemented method of database rollback to a previous state of a database may be executed, the following example may be considered (with reference to FIG. 2). A database having a total of N=4 pages has recently gone through the following operations:

1) At a checkpoint $c_3$, a checkpoint operation was completed, the database updated and the WAL reset.
2) The pages 1, 2, 1, 3, 3, 4, 1, 4, 3, 3, 2, 4, 1, 2, 3, and 1 were updated (in the given chronological order), and the revised contents of the corresponding pages were recorded to the WAL.
3) At a checkpoint $c_2$, subsequent in time to $c_3$, another checkpoint operation was completed, the database updated and the WAL reset.
4) The pages 4, 1, 2, 1, 2, 1, 1, 3, 3, 1, and 2 were updated (in the given chronological order), and the revised contents of the corresponding pages were recorded to the WAL.
5) At a checkpoint $c_1$, subsequent in time to $c_2$, a final checkpoint operation was completed, the database updated and the WAL reset.
6) The pages 2, 1, 1 and 3, were updated (in the given chronological order), and the revised contents of the corresponding pages were recorded to the WAL.

After having gone through all the operations listed above, the current state of the database 101 and the WAL 102 is illustrated in FIG. 2. The database 101 comprises a first set D={1, 2, 3, 4} of pages, and the WAL 102 comprises a set $S=\{F_1, F_2, \ldots, F_{16}\}$ of recorded frames, where the frames represents revised contents of a second set $$D'=\{2,1,1,3,2,1,1,3,3,1,2,4,1,2,3,1\}$$

of corresponding pages. Since the second operation involved revising the content of 16 pages in total, some of the frames representing the revised content of these pages are still left in the WAL 102. This is because no subsequent operation involved updating more than 16 pages in total, which means that some of the 16 pages have not been overwritten by such a subsequent operation. Since the fourth operation involved revising the content of a total of 11 pages, some of the corresponding frames are also still present in the WAL 102, since the sixth operation involved revising the content of only 4 pages. During the latest checkpoint operation the database 101 was updated such that the content of the first page 110a of the database corresponds to the revised content of the page found in frame $F_{10}$ in the WAL 102 (that is, $F_{10} \rightarrow 1$). Also, the content of the second page 110b corresponds to the revised content of the page found in frame $F_{11}$ ($F_{11} \rightarrow 2$) and the content of the third page 110c corresponds to the revised content of the page found in frame $F_9$ ($F_9 \rightarrow 3$). The content of the fourth page 110d of the database 101 is not found in the frames of the WAL 102, but as described above the fourth page 110d was updated during the latest checkpoint operation although the corresponding frame has since been overwritten during subsequent updates (e.g. during the sixth operation).

As is illustrated in the figure, each frame in the WAL 102 corresponds to a checkpoint in the set $C=\{c_1, c_2, c_3\}$ of checkpoints, and by taking the order in which frames corresponding to the same checkpoint are recorded in the WAL 102 into account, the frames may be sorted chronologically. Each frame may include e.g. an index corresponding to its corresponding checkpoint, and the database 101 itself may include a reference (e.g. a SALT value) to the latest performed checkpoint operation in order for the database system to determine which frames in the WAL 102 that are "active" or "live" (that is, frames which right now contains revised contents of pages that are more recent than that of the pages currently stored in the database 101, i.e. frames $F_1$ to $F_4$ in the WAL 102).

Figure 3:
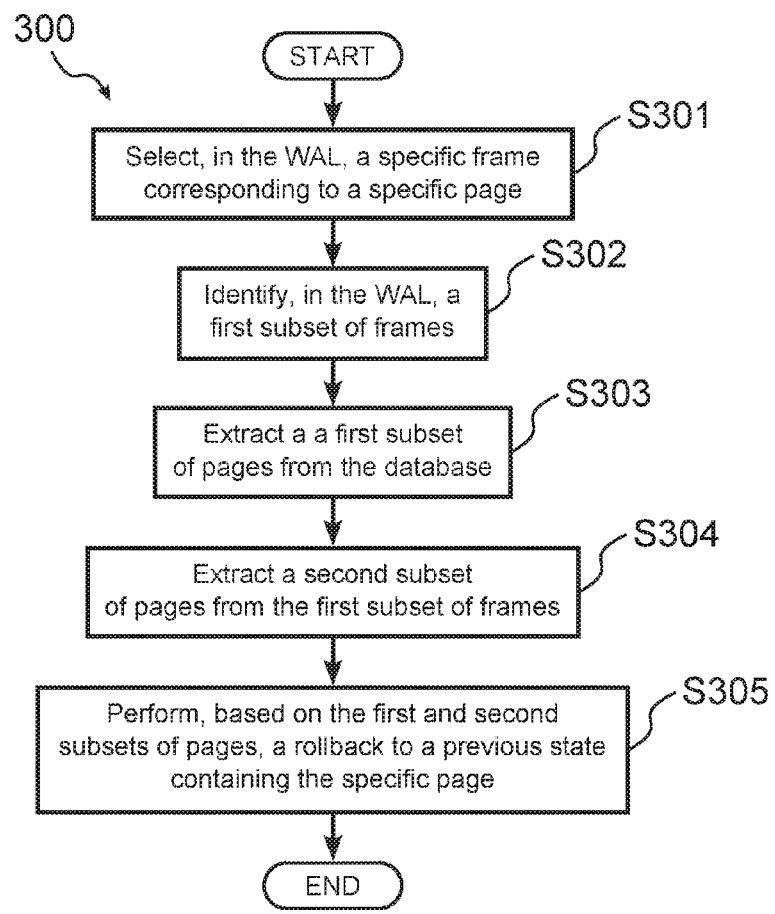
FIG. 3 is a flowchart of a method of performing database rollback to a previous state of a database in accordance with an example embodiment.

In order to extract information about a previous state of the database 101, a method 300 (as is illustrated by the flowchart in FIG. 3) in accordance with an example embodiment of the present invention may consist of first selecting S301 a specific frame $F_M$. In the current example, it is assumed that the specific frame is selected such that M=10 and $F_M=F_{10}$, and the specific frame corresponds to the checkpoint $c_2$ that chronologically precedes the one checkpoint $c_1 \in C$. Next, a first subset $S_f \subseteq S$ is identified S302 such that $S_f$ contains the specific frame $F_M$ and thereto zero or more chronologically preceding frames. In the example, $S_f$ is selected such that $S_f = \{F_5, F_9, F_{10}\}$. From the first set D of pages, a first subset $D_1=\{4\}$ is extracted S303, and a second subset $D'_f = \{1, 2, 3\}$ of pages are extracted S304 from the corresponding pages of the first subset $S_f$ of frames (where $F_5 \rightarrow 2$, $F_9 \rightarrow 3$ and $F_{10} \rightarrow 1$). Based on the content of the page in $D_1$ and the revised contents of the pages in $D'_f$, a rollback of the database to a previous state containing the specific revised content of the specific page $P_{10}$ (represented by the specific frame $F_{10}$) may be performed S305. The contents of the first three pages 110a-110c of the database 101 at the previous state are found in $D'_f$, and the content of the fourth page 110d of the database 101 at the previous state is found in $D_1$.

In the above example, the specific frame was selected such that its corresponding checkpoint preceded exactly one other checkpoint in the set C of checkpoints. According to one example embodiment, the specific frame may intentionally be selected such that its corresponding checkpoint precedes exactly one other checkpoint. While a conventional method of database rollback using the WAL 102 would only extract states equal or subsequent in time to the latest checkpoint, a method according to the present invention would thus be able to extract information about a previous database state containing the revised content of $P_M$, a state that precedes the latest performed checkpoint operation.

In another example embodiment, the method may further, in addition to selecting $F_M$ such that its corresponding checkpoint precedes exactly one other checkpoint in C, include a step where a second subset $S_l=\{F_{11}\}$ of frames is identified, in the set S of frames, such that $S_l$ contains zero or more to the specific frame $F_{10}$ subsequent frames, and where $S_l$ corresponds to a third subset $D'_l=\{2\}$ of pages. The method may then determine that the third subset $D'_l$ of pages is a subset of the second subset $D'_f$ of pages, and indicate that the previous state extracted by the method is a "true" previous state. When the specific frame $F_{10}$ is selected, the revised content of page 2 found in frame $F_{11}$ must be ignored and replaced with what it was before the action which led to frame $F_{11}$ being recorded was performed. The wanted revised content (of page 2) is found in frame $F_5$ (i.e., in $D'_f$), and the previous state is thus a true state in the sense that all the contents of the pages of the previous state are the same as they were at the time when $F_{10}$ had just been recorded to the WAL 102.

In another example embodiment, the method may instead identify another third subset $D'_l$ of pages and determine that this subset is not a subset of the second subset of pages $D'_f$. This may be achieved by determining that $D'_l$ contains at least one page $P_A \in D'_l$ that is not part of the second subset of pages ($P_A \notin D'_f$). The method may then indicate that the extracted previous state is not a true previous state. As an illustration, if the specific frame of the earlier example was instead selected such that M=7 and $F_M=F_7$, a possible further selection would be $S_f=\{F_5, F_7\}$, $D_1=\{4\}$, and $D'_f=\{1, 2\}$ (where $F_5 \rightarrow 1$ and $F_7 \rightarrow 2$). If $S_l=\{F_8, F_{10}, F_{11}\}$ (such that $D'_l=\{1, 2, 3\}$), it is obvious that the page 3 (from $F_8 \rightarrow 3$) in $D'_l$ is not found in $D'_f$. Thus, the action that led to frame $F_8$ being recorded cannot be reversed since no exact knowledge about the revised content of page 3 is available. It should, however, be noted that the extraction of a previous state that is not a true previous state may still be valuable, since the contents of at least some of the pages (e.g. pages 1, 2 and 4) of the extracted previous state are still the same as they were at the time when $F_7$ had just been recorded.

In another example embodiment, the specific frame may be selected such that e.g. M=15 and $F_M=F_{15}$. If this is the case, the corresponding checkpoint precedes more than one checkpoint in C since $F_{15}$ precedes both of the checkpoints $c_1$ and $c_2$. A possible selection of subsets would be $S_f=\{F_{12}, F_{13}, F_{14}, F_{15}\}$, $D_1=\emptyset$, and $D'_f=\{1, 2, 3, 4\}$ (where $F_{13} \rightarrow 1$, $F_{14} \rightarrow 2$, $F_{15} \rightarrow 3$ and $F_{12} \rightarrow 4$), and a database rollback to a previous state containing $P_{15}$ may be performed, where the content of the pages are all found in $D'_f$.

In one embodiment, the method may further include the step of determining that the first set D of pages is a subset of the second subset $D'_f$ of pages ($D \subseteq D'_f$), and indicate that the previous state extracted by the method is a true previous state. Since, as in the previous example embodiment, $D'_f$ contains a revised version of every page found in D, it is sure that the extracted previous state is a true previous state.

In another embodiment, the method may include the step of determining that the first set D of pages is not a subset of the second subset $D'_f$ of pages. This can be achieved by determining that D contains at least one page that is not found in $D'_f$. If this is the case, the method may indicate that the extracted previous state is not a true previous state. For example, if the frame $F_{14}$ would instead have represented a revised content of page 1 (instead of page 2), no knowledge about the revised content of page 2 would be available, and the action that led to e.g. frame $F_5$ being recorded (a frame also representing a revised content of page 2) cannot be reversed. Still, even though an extracted previous state is not a true state, it may still be useful since the content of at least one of the pages (page $P_M$) is the same as it were just after $F_M$ was recorded.

In another example, if the specific frame is selected such that its corresponding checkpoint does not chronologically precede any other checkpoint (i.e., if the specific frame was added to the WAL 102 after the latest checkpoint operation), a rollback of the database 101 to a previous state containing the specific revised content of the specific page is straightforward. A method for doing so would, still using the example illustrated in FIG. 2, comprise selecting a specific frame such that M $\in\{1, 2, 3, 4\}$. If, for example, M=3 and $F_M=F_3$, a possible selection of subsets may be $S_f=\{F_1, F_3\}$, $D_1=\{3, 4\}$, and $D'_f=\{1, 2\}$ (where $F_3 \rightarrow 1$ and $F_1 \rightarrow 2$), after which a rollback to a previous state containing $P_3$ may be performed. A previous state with such a corresponding specific frame would always be a true previous state (under that the assumption that none of the database, WAL or checkpoint information, has been corrupted).

Figure 4:
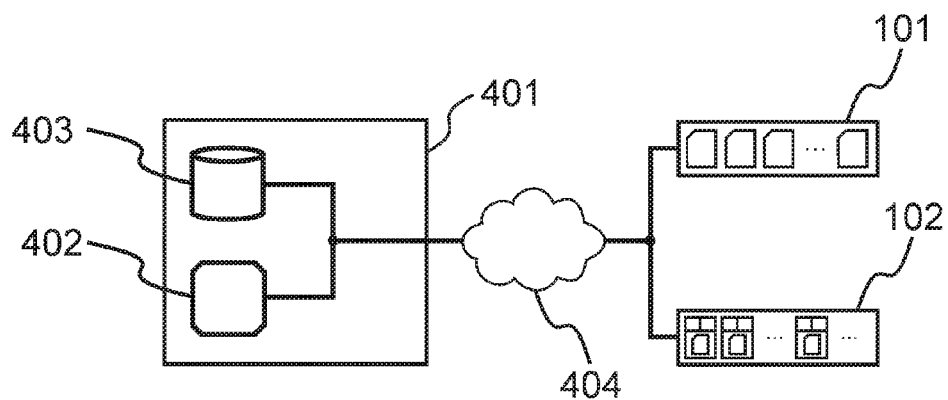
FIG. 4 is a block diagram of a device for performing database rollback to a previous state of a database in accordance with an example embodiment.

A device configured to perform database rollback to a previous state of a database 101, according to an example embodiment, is illustrated in FIG. 4. The device 401 is adapted to access the database 101 and the therewith associated WAL 102 and checkpoint information. This access is provided by access means 404 that can be e.g. a network, a local bus, a wire, a wireless link, or any other type suitable therefor. The device comprises a memory 403 and a processor 402, where the processor is configured to select, in the set of frames in the WAL 102, a specific frame upon request. The specific frame represents a specific revised content of a corresponding specific page, and the specific frame corresponds to a checkpoint that chronologically precedes zero or more checkpoints in the set of at least one checkpoint. The processor 402 is further configured to identify, in the set of frames, a first subset of frames that contains the specific frame and thereto zero or more chronologically preceding frames. The processor 402 is also configured to extract a first subset of pages from the first set of pages, and to extract a second subset of pages from the corresponding pages of the first subset of frames. The processor 402 is configured to perform a rollback of the database 101 to a previous state that contains the specific revised content of the specific page, where the rollback is performed based on the content of the first subset of pages and the revised content of the second subset of pages. When needed to, the processor may use the memory 403 to temporarily and permanently store information. The database 101 (and/or the WAL 102) may be available to the device 401 from a separate location, or the device 401 and the database (and/or the WAL 102) may be integrated together (i.e. the database 101 and/or the WAL 102 may be stored on e.g. a medium comprised in the device 401 itself).

In contrast to using methods such as data carving to extract information about deleted or modified data of a database, the method of the present invention is not statistical in nature, and the trustworthiness of the results can (provided that the database and or the WAL has not suffered from corruption) be known with certainty. In addition to having problems with piecing together data belonging to the same database, a carving based method may face even greater problems trying to figure out what data that belongs to which table in the database (especially if some of the tables share the same arrangement of columns). Using the method of the present invention, this is not a problem since the WAL will contain the information needed. A method according to the present invention may also be able to show how a database looked like at several instances of time, a task not feasible for a carving method that have no ability to pinpoint a certain piece of data to a certain point in time. The same is true if the database has gone through changes to its database schema (the arrangement of e.g. its tables and columns). If, for instance, a table has been given new columns, or if the order of the columns have changed, a carving based method will have no reasonable chance of analyzing data inserted prior to when the changes to the table were made. With a method making use of the present invention, the current schema (i.e. table and column arrangement) at each instance of time is found in the WAL. A carving based method may also face problems when trying to analyze data belonging to a database where the tables somehow relate to each other, since the connection between two tables is usually lost at the time the data carving is about to be performed. The same is true for databases whose structure has intentionally been tailored to hinder forensic analysis, such as fragmented databases where all main data is stored in a single key-value table, and where additional tables are used to combine different key-values in order to extract human readable information. A method making use of the present invention is less prone to such intentional hindering.

Still further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The devices and methods disclosed hereinabove may be implemented as software, firmware, hardware or a combination thereof. Although the steps of a method are, for reasons of clarity, listed sequentially, some or all of the steps may, if suitable, be performed in parallel. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method for recovering a previous state of a database using a write-ahead log (WAL), the method comprising:
selecting, in a set of frames associated with the WAL, a specific frame representing a specific revised content of a corresponding specific page of the database, said specific frame corresponding to a checkpoint that chronologically precedes at least one other checkpoint in a set of checkpoints associated with the WAL, wherein the database comprises a first set of pages, the database is a SQLite database or a derivative thereof, the database is configured to use the WAL into which the set of frames has been recorded, the set of frames representing revised contents of a second set of pages of the database, each frame of the set of frames represents a revised content of a corresponding page of the database, the database is further associated with checkpoint information indicating that revised content of at least one page of the database was transferred from the WAL to the database at the set of checkpoints, each checkpoint of the set of checkpoints corresponds to a point in time, and each frame in the set of frames corresponds to one checkpoint of the set of checkpoints, and the WAL comprises information allowing the frames to be chronologically ordered;
identifying, in the set of frames associated with the WAL, a first subset of frames comprising the specific frame and thereto zero or more chronologically preceding frames;
extracting, from the first set of pages, a first subset of pages;
extracting, from the corresponding pages of the first subset of frames, a second subset of pages;
extracting a previous state of the database using the WAL, wherein the previous state comprises the specific revised content of the specific page and the previous state is extracted based on the content of the first subset of pages and the revised content of the second subset of pages, the specific frame corresponding to a checkpoint that chronologically precedes at least one other checkpoint in the set of checkpoints associated with the WAL;
identifying, in the set of frames associated with the WAL, a second subset of frames comprising one or more chronologically subsequent frames to the specific frame, said second subset of frames corresponding to a third subset of pages;
determining whether the third subset of pages comprises at least one page that is not part of the second subset of pages; and
indicating that the previous state is not a true previous state, upon determining that the third subset of pages comprises at least one page that is not part of the second subset of pages.

2. The method of claim 1, further comprising:
indicating that the previous state is a true previous state upon determining that the third subset of pages is a subset of the second subset of pages.

3. The method of claim 1, wherein the checkpoint information is comprised in the WAL.

4. The method of claim 1, wherein the information allowing the frames to be chronologically ordered comprises one or more of the order in which frames are written in the WAL, a salt value, or a counting index.

5. A device configured to recover a previous state of a database using a write-ahead log (WAL), the database comprising a first set of pages, the device comprising:
a memory, wherein the database is configured to use the WAL into which a set of frames associated with the WAL has been recorded, the set of frames representing revised contents of a second set of pages of the database, each frame of the set of frames represents a revised content of a corresponding page of the database, the database is associated with checkpoint information indicating that revised content of at least one page of the database was transferred from the WAL to the database at a set of checkpoints, each checkpoint of the set of checkpoints corresponds to a point in time, each frame in the set of frames corresponds to one checkpoint of the set of checkpoints, the WAL comprises information allowing the frames to be chronologically ordered, and the device is adapted to access the database and the associated WAL and checkpoint information; and
a processor configured to:
select, in the set of frames associated with the WAL, a specific frame representing a specific revised content of a corresponding specific page of the database upon request, said specific frame corresponding to a checkpoint that chronologically precedes at least one other checkpoint in the set of checkpoints associated with the WAL;
identify, in the set of frames associated with the WAL, a first subset of frames comprising the specific frame and thereto zero or more chronologically preceding frames;
extract, from the first set of pages, a first subset of pages;
extract, from the corresponding pages of the first subset of frames, a second subset of pages;
extracting a previous state of the database using the WAL, wherein the previous state comprises the specific revised content of the specific page and the previous state is extracted based on the content of the first subset of pages and the revised content of the second subset of pages;
identify, in the set of frames associated with the WAL, a second subset of frames comprising one or more chronologically subsequent frames to the specific frame, said second subset of frames corresponding to a third subset of pages;
determine whether the third subset of pages comprises at least one page that is not part of the second subset of pages; and
indicate that the previous state is not a true previous state upon determining that the third subset of pages comprises at least one page that is not part of the second subset of pages.

6. The device according to claim 5, wherein the processor is further configured to:
indicate that the previous state is a true previous state upon determining that the third subset of pages is a subset of the second subset of pages.

7. The device according to claim 5, wherein the database is a SQLite database or a derivative thereof.

8. The device according to claim 5, wherein the checkpoint information is comprised in the WAL.

9. The device according to claim 5, wherein the information allowing the frames to be chronologically ordered comprises one or more of the order in which frames are written in the WAL, a salt value, or a counting index.

10. A computer-readable storage media comprising instructions that when executed by a processor cause the processor to perform a method comprising:
- selecting, in a set of frames associated with a write-ahead log (WAL), a specific frame representing a specific revised content of a corresponding specific page of a database, said specific frame corresponding to a checkpoint that chronologically precedes at least one other checkpoint in a set of checkpoints associated with the WAL, wherein the database comprises a first set of pages, the database is a SQLite database or a derivative thereof, the database is configured to use the WAL into which the set of frames has been recorded, the set of frames representing revised contents of a second set of pages of the database, each frame of the set of frames represents a revised content of a corresponding page of the database, the database is further associated with checkpoint information indicating that revised content of at least one page of the database was transferred from the WAL to the database at the set of checkpoints, each checkpoint of the set of checkpoints corresponds to a point in time, each frame in the set of frames corresponds to one checkpoint of the set of checkpoints, and the WAL comprises information allowing the frames to be chronologically ordered;
- identifying, in the set of frames associated with the WAL, a first subset of frames comprising the specific frame and thereto zero or more chronologically preceding frames;
- extracting, from the first set of pages, a first subset of pages;
- extracting, from the corresponding pages of the first subset of frames, a second subset of pages;
- extracting a previous state of the database using the WAL, wherein the previous state comprises the specific revised content of the specific page and the previous state is extracted based on the content of the first subset of pages and the revised content of the second subset of pages, the specific frame corresponds to a checkpoint that chronologically precedes at least one other checkpoint in the set of checkpoints associated with the WAL;
- identifying, in the set of frames associated with the WAL, a second subset of frames comprising one or more chronologically subsequent frames to the specific frame, said second subset of frames corresponding to a third subset of pages;
- determining whether the third subset of pages comprises at least one page that is not part of the second subset of pages; and
- indicating that the previous state is not a true previous state, upon determining that the third subset of pages comprises at least one page that is not part of the second subset of pages.

11. The computer readable storage media of claim 10, wherein the method further comprises:
- indicating that the previous state is a true previous state upon determining that the third subset of pages is a subset of the second subset of pages.

12. The computer readable storage media of claim 10, wherein the checkpoint information is comprised in the WAL.

13. The computer readable storage media of claim 10, wherein the information allowing the frames to be chronologically ordered comprises one or more of the order in which frames are written in the WAL, a salt value, or a counting index.

* * * * *